US012236308B1

(12) United States Patent
Li et al.

(10) Patent No.: US 12,236,308 B1
(45) Date of Patent: *Feb. 25, 2025

(54) MAGNETIC CARDS AND DEVICES FOR MOTORIZED READERS

(71) Applicant: Dynamics Inc., Cheswick, PA (US)

(72) Inventors: Chengliu Li, Wexford, PA (US); James H. Workley, Imperial, PA (US); Kevin David Bruner, Pittsburgh, PA (US); Allen D. Bowers, Tarentum, PA (US)

(73) Assignee: Dynamics Inc., Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,184

(22) Filed: Jun. 21, 2018

Related U.S. Application Data

(63) Continuation of application No. 15/440,224, filed on Feb. 23, 2017, now Pat. No. 10,032,049.

(60) Provisional application No. 62/298,693, filed on Feb. 23, 2016.

(51) Int. Cl.
| | |
|---|---|
| *G06K 7/08* | (2006.01) |
| *G06K 19/06* | (2006.01) |
| *G06K 19/07* | (2006.01) |
| *G06K 19/077* | (2006.01) |

(52) U.S. Cl.
CPC ............ *G06K 7/084* (2013.01); *G06K 7/082* (2013.01); *G06K 19/06206* (2013.01); *G06K 19/0702* (2013.01); *G06K 19/0723* (2013.01); *G06K 19/07707* (2013.01); *G06K 19/07709* (2013.01)

(58) Field of Classification Search
CPC ....... G06K 19/06187; G06K 19/06196; G06K 19/06206; G06K 7/08; G06K 7/082; G06K 7/083; G06K 7/084; G06K 7/087; G06K 7/0095

USPC .................................................. 235/449, 493
See application file for complete search history.

(56) References Cited

U.S. PATENT DOCUMENTS

| | | | |
|---|---|---|---|
| 4,353,064 | A | 10/1982 | Stamm |
| 4,394,654 | A | 7/1983 | Hofmann-Cerfontaine |
| 4,614,861 | A | 9/1986 | Pavlov et al. |
| 4,667,087 | A | 5/1987 | Quintana |
| 4,701,601 | A | 10/1987 | Francini et al. |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

The Bank Credit Card Business. Second Edition, American Bankers Association, Washington, D.C., 1996.

(Continued)

*Primary Examiner* — Suezu Ellis
(74) *Attorney, Agent, or Firm* — Morris Law Group; Robert W. Morris

(57) ABSTRACT

One or more detection activities of a card may allow calculation of rolling speed in motorized readers. Accordingly, the detection activity may result in a data transmission speed with greater accuracy after a determination of position, velocity and/or acceleration of the faster-moving device in relation to the card. Such detection activities may increase a probability of a successful communication sequence.

16 Claims, 11 Drawing Sheets

(56) References Cited

U.S. PATENT DOCUMENTS

| | | |
|---|---|---|
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,955,961 A | 9/1999 | Wallerstein |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| D643,063 S | 8/2011 | Mullen et al. |
| 8,011,577 B2 | 9/2011 | Mullen et al. |
| 8,020,775 B2 | 9/2011 | Mullen et al. |
| 8,066,191 B1 | 11/2011 | Cloutier et al. |
| D651,237 S | 12/2011 | Mullen et al. |
| D651,238 S | 12/2011 | Mullen et al. |
| 8,074,877 B2 | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |

(56) References Cited

U.S. PATENT DOCUMENTS

| | | |
|---|---|---|
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| 8,172,148 B1 | 5/2012 | Cloutier et al. |
| D665,022 S | 8/2012 | Mullen et al. |
| D665,447 S | 8/2012 | Mullen et al. |
| D666,241 S | 8/2012 | Mullen et al. |
| 8,282,007 B1 | 10/2012 | Cloutier et al. |
| 8,286,876 B2 | 10/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| 8,348,172 B1 | 1/2013 | Cloutier et al. |
| D676,487 S | 2/2013 | Mullen et al. |
| D676,904 S | 2/2013 | Mullen et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| D687,094 S | 7/2013 | Mullen et al. |
| D687,095 S | 7/2013 | Mullen et al. |
| 8,485,437 B2 | 7/2013 | Mullen et al. |
| 8,485,446 B1 | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| D692,053 S | 10/2013 | Mullen et al. |
| 8,561,894 B1 | 10/2013 | Mullen et al. |
| 8,567,679 B1 | 10/2013 | Mullen et al. |
| D694,322 S | 11/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| D695,636 S | 12/2013 | Mullen et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,628,022 B1 | 1/2014 | Rhoades et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,827,153 B1 | 9/2014 | Rhoades et al. |
| 8,875,999 B2 | 11/2014 | Mullen et al. |
| 8,881,989 B2 | 11/2014 | Mullen et al. |
| 8,888,009 B1 | 11/2014 | Mullen |
| 8,931,703 B1 | 1/2015 | Mullen et al. |
| 8,944,333 B1 | 2/2015 | Mullen et al. |
| 8,960,545 B1 | 2/2015 | Batra |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,010,644 B1 | 4/2015 | Workley |
| 9,010,647 B2 | 4/2015 | Workley et al. |
| D729,869 S | 5/2015 | Mullen et al. |
| D729,870 S | 5/2015 | Mullen et al. |
| D729,871 S | 5/2015 | Mullen et al. |
| D730,438 S | 5/2015 | Mullen et al. |
| D730,439 S | 5/2015 | Mullen et al. |
| 9,033,218 B1 | 5/2015 | Batra |
| 9,053,398 B1 | 6/2015 | Cloutier |
| 9,064,194 B1 | 6/2015 | Bohac, Jr. |
| 9,064,195 B2 | 6/2015 | Hartwick et al. |
| 9,064,255 B1 | 6/2015 | Mullen et al. |
| D737,373 S | 8/2015 | O'Shea et al. |
| D750,166 S | 2/2016 | Nicklaus et al. |
| D750,167 S | 2/2016 | Nicklaus et al. |
| D750,168 S | 2/2016 | Nicklaus et al. |
| D751,639 S | 3/2016 | Mullen et al. |
| D751,640 S | 3/2016 | Nicklaus et al. |
| 9,292,843 B1 | 3/2016 | Mullen et al. |
| 9,306,666 B1 | 4/2016 | Zhang et al. |
| 9,329,619 B1 | 5/2016 | Cloutier |
| 9,349,089 B1 | 5/2016 | Rhoades et al. |
| 9,361,569 B2 | 6/2016 | Mullen et al. |
| 9,373,069 B2 | 6/2016 | Cloutier et al. |
| 9,384,438 B2 | 7/2016 | Mullen et al. |
| D764,584 S | 8/2016 | Nicklaus et al. |
| D765,173 S | 8/2016 | Mullen et al. |
| D765,174 S | 8/2016 | Nicklaus et al. |
| D767,024 S | 9/2016 | O'Shea et al. |
| D777,252 S | 1/2017 | Nicklaus et al. |
| 9,547,816 B2 | 1/2017 | Mullen et al. |
| 9,619,741 B1 | 4/2017 | Rigatti |
| 9,639,796 B2 | 5/2017 | Mullen et al. |
| 9,646,240 B1 | 5/2017 | Mullen et al. |
| 9,646,750 B1 | 5/2017 | Workley |
| 9,652,436 B1 | 5/2017 | Yen et al. |
| 9,659,246 B1 | 5/2017 | Workley |
| 9,684,861 B2 | 6/2017 | Mullen et al. |
| D792,511 S | 7/2017 | Mullen et al. |
| D792,512 S | 7/2017 | Mullen et al. |
| D792,513 S | 7/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,710,745 B1 | 7/2017 | O'Shea |
| 9,721,201 B2 | 8/2017 | Mullen et al. |
| 9,727,813 B2 | 8/2017 | Mullen et al. |
| 9,734,669 B1 | 8/2017 | Mullen et al. |
| 9,805,297 B2 | 10/2017 | Mullen et al. |
| 9,818,125 B2 | 11/2017 | Mullen et al. |
| 9,836,680 B1 | 12/2017 | Cloutier |
| 9,852,368 B1 | 12/2017 | Yen et al. |
| 9,875,437 B2 | 1/2018 | Cloutier et al. |
| 9,881,245 B1 | 1/2018 | Rhoades et al. |
| 9,916,992 B2 | 3/2018 | Mullen et al. |
| 9,928,456 B1 | 3/2018 | Cloutier et al. |
| 9,953,255 B1 | 4/2018 | Yen et al. |
| 10,022,884 B1 | 7/2018 | Cloutier |
| 10,032,049 B2 * | 7/2018 | Li .................... G06K 19/06206 |
| 10,032,100 B2 | 7/2018 | Mullen et al. |
| 10,055,614 B1 | 8/2018 | Cloutier et al. |
| 10,062,024 B1 | 8/2018 | Bohac, Jr. |
| D828,870 S | 9/2018 | Mullen et al. |
| 10,095,970 B1 | 10/2018 | Mullen |
| 10,095,974 B1 | 10/2018 | Mullen et al. |
| 10,108,891 B1 | 10/2018 | Yu et al. |
| 10,169,692 B2 | 1/2019 | Mullen et al. |
| 10,169,693 B1 | 1/2019 | Batra |
| 10,176,419 B1 | 1/2019 | Cloutier et al. |
| 10,176,423 B1 | 1/2019 | Mullen et al. |
| 10,181,097 B1 | 1/2019 | Mullen et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 10,311,349 B1 | 6/2019 | Workley |
| 10,325,199 B2 | 6/2019 | Mullen et al. |
| 10,395,156 B1 | 8/2019 | Batra |
| 10,430,704 B2 | 10/2019 | Mullen et al. |
| 10,467,521 B2 | 11/2019 | Mullen et al. |
| 10,482,363 B1 | 11/2019 | Cloutier et al. |
| 10,496,918 B2 | 12/2019 | Mullen et al. |
| 10,504,105 B2 | 12/2019 | Mullen et al. |

(56) References Cited

U.S. PATENT DOCUMENTS

| | | |
|---|---|---|
| 10,579,920 B2 | 3/2020 | Mullen et al. |
| 10,693,263 B1 | 6/2020 | Mullen et al. |
| 10,922,597 B1 | 2/2021 | Workley |
| 10,936,926 B1 | 3/2021 | Rhoades et al. |
| 10,948,964 B1 | 3/2021 | Cloutier |
| 10,997,489 B2 | 5/2021 | Mullen et al. |
| 11,062,195 B2 | 7/2021 | Mullen |
| 11,144,909 B1 | 10/2021 | Mullen et al. |
| 11,238,329 B2 | 2/2022 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2011/0028184 A1 | 2/2011 | Cooper |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |

(56) References Cited

U.S. PATENT DOCUMENTS

| | | |
|---|---|---|
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0197708 A1 | 8/2012 | Mullen et al. |
| 2012/0209744 A1 | 8/2012 | Mullen et al. |
| 2012/0254037 A1 | 10/2012 | Mullen |
| 2012/0254038 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0217152 A1 | 8/2013 | Mullen et al. |
| 2013/0282573 A1 | 10/2013 | Mullen et al. |
| 2013/0282575 A1 | 10/2013 | Mullen et al. |
| 2014/0001269 A1 | 1/2014 | Hartwick et al. |
| 2014/0054384 A1 | 2/2014 | Cloutier et al. |
| 2014/0117094 A1 | 5/2014 | Workley et al. |
| 2014/0175170 A1 | 6/2014 | Bowers |
| 2014/0203902 A1 | 7/2014 | Shippee et al. |
| 2014/0233166 A1 | 8/2014 | O'Shea |
| 2015/0186766 A1 | 7/2015 | Mullen et al. |
| 2015/0193679 A1 | 7/2015 | Workley et al. |
| 2015/0254546 A1 | 9/2015 | Hartwick et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0335531 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0011386 A1 | 1/2017 | Mullen et al. |
| 2017/0011388 A1 | 1/2017 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2018/0060881 A1 | 3/2018 | Mullen et al. |
| 2018/0151391 A1 | 5/2018 | Mullen et al. |
| 2018/0165704 A1 | 6/2018 | Mullen et al. |
| 2018/0232612 A1 | 8/2018 | Workley et al. |
| 2019/0026613 A1 | 1/2019 | O'Shea |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

A Day in the Life of a Flux Reversal. http:--www.phrack-org-issues.html?issue=37&id=6#article. As viewed on Apr. 12, 2010.

Dynamic Virtual Credit Card Numbers. http:--homes.cerias.purdue.edu~jtli-paper-fc07.pdf. As viewed on Apr. 12, 2010.

English translation of JP 05210770, retrieved Apr. 8, 2010.

\* cited by examiner

MAGNETIC CARDS AND DEVICES FOR MOTORIZED READERS

BACKGROUND OF THE INVENTION

This invention relates to magnetic cards and devices and related systems.

SUMMARY OF THE INVENTION

A card may include a dynamic magnetic communications device, which may take the form of a magnetic encoder or an electromagnetic generator. A magnetic encoder, for example, may be utilized to modify information that is located on a magnetic medium, such that a magnetic stripe reader may then be utilized to read the modified magnetic information from the magnetic medium. An electromagnetic generator, for example, may be provided to generate electromagnetic fields that directly communicate data to a read-head of a magnetic stripe reader. An electromagnetic generator, for example, may communicate data serially to a read-head of the magnetic stripe reader. An electromagnetic generator, for example, may communicate data in parallel to a read-head of a magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two-layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic communications device may include, for example, three coils such that three tracks of information may be communicated to three different read-heads included in a read-head housing of a magnetic stripe reader.

Input and/or output devices may be included on a card, for example, to facilitate data exchange with the card. For example, an integrated circuit (IC) may be included on a card and exposed from the surface of the card. Such a chip (e.g., an EMV chip) may communicate information to a chip reader (e.g., an EMV chip reader). An RFID antenna or module may be included on a card, for example, to send and/or receive information between an RFID reader and the RFID included on the card.

One or more detectors may be provided, for example, to sense the presence of an external object, such as a person or device, which in turn, may trigger a communication sequence with the external object. Accordingly, for example, timing aspects of an information exchange between an external object and the various I/O devices implemented on a card may be determined by a processor of a card.

A sensed presence of an external object or device may include the type of object or device that is detected and, therefore, may then determine the type of communication that is to be used with the detected object or device. For example, a detected object may include a determination that the object is a read-head housing of a magnetic stripe reader. Such an identifying detection, for example, may activate a dynamic magnetic stripe communications device so that information may be communicated (e.g., electromagnetically communicated) to the read-head of the magnetic stripe reader.

One or more read-head detectors, for example, may be provided on a card. The one or more read-head detectors may be provided as, for example, conductive pads that may be arranged along a length of a card having a variety of shapes. A property (e.g., a capacitance magnitude) of one or more of the conductive pads may, for example, change in response to contact with and/or the proximity of an object.

A card may, for example, be swiped across a read-head of a magnetic stripe reader, such that a series of conductive pads arranged along a length of the card may be used to sequentially detect the presence of the read-head as the read-head moves in relation to the card. In doing so, for example, a series of detections (e.g., the capacitance magnitude of a series of conductive pads may increase and/or decrease) which may be indicative of a direction of a card swipe, a velocity of a card swipe and/or an acceleration of a card swipe.

In some instances, a width of a read-head may be wider than a single conductive pad (e.g., a read-head may span a width that may be substantially equal to a width of two conductive pads). As a result, more than one conductive pad may exhibit a change in capacitance magnitude when, for example, a read-head comes into contact with two or more conductive pads or when a read-head is positioned proximate to two or more conductive pads.

Nevertheless, rules may be implemented, for example, whereby a property change (e.g., an increased and/or decreased capacitance magnitude) detected in any one conductive pad during a first measurement period may not be allowed to affect a property change (e.g., an increased and/or decreased capacitance magnitude) detected in the same conductive pad during a second measurement period. Accordingly, for example, the accuracy of position, velocity and/or acceleration detections may not be affected by an analysis of property changes induced within one conductive pad over multiple periods of time. In so doing, a speed of a card swipe, for example, may be increased without sacrificing a detection accuracy of the card swipe (e.g., without losing the ability to detect a location, velocity and/or acceleration of a read head or contact with a read head in relation to a card being swiped through the read-head housing).

False alarm detection may be implemented to reduce occurrences of false alarms. For example, certain objects (e.g., a finger) may cause a processor of a card to detect, for example, a presence of a read-head housing of a magnetic stripe reader when, in fact, no read-head housing is present. In such instances, knowledge of, for example, a previously detected card swipe and associated direction may allow a second detection to be made, whereby a second read-head detection that is consistent with the originally detected card swipe direction may enable verification of a legitimate card swipe and, therefore, may enable a successful communication sequence with a magnetic stripe reader whose presence has been detected and verified.

For example, an analysis of a capacitance magnitude change of one or more conductive pads of a first row of conductive pads may be performed to determine, for example, a presence of a read-head and a direction of movement that the read-head exhibits relative to the first row of conductive pads. A subsequent analysis of a capacitance magnitude change of one or more conductive pads along a second row of conductive pads in the same direction as previously detected may serve to legitimize a first detection of a read-head and, therefore, may increase a probability that a successful communication sequence between the card and the magnetic stripe reader may transpire.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
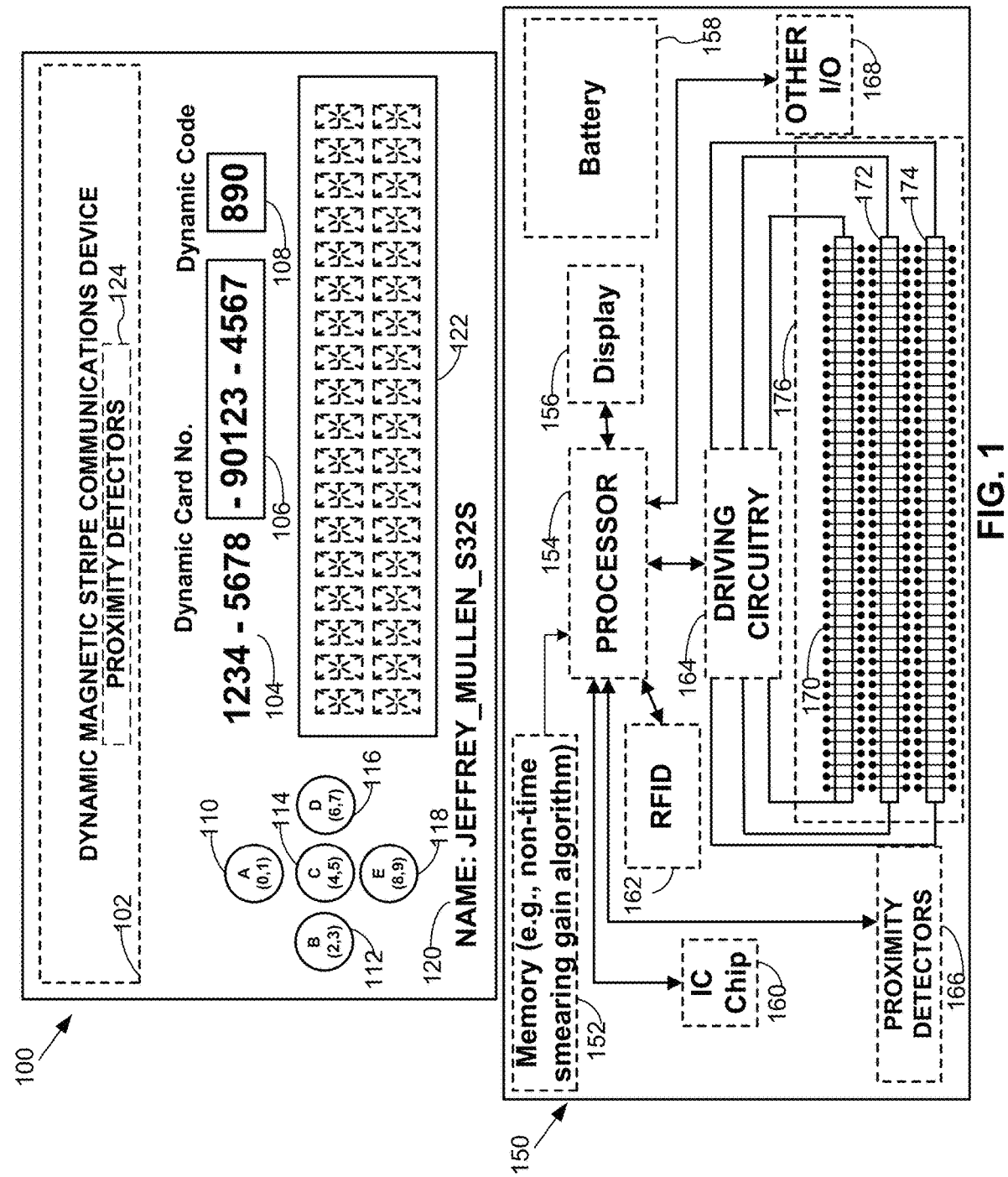
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may include third display 122 that may be used to display graphical information, such as logos and barcodes. Third display 122 may be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

Two or more detectors 124 may be implemented to detect, for example, the proximity, or actual contact, of an object, such as a read-head housing of a magnetic stripe reader. Proximity detectors 124 may be utilized, for example, to detect a magnetic stripe reader during a transaction (e.g., a card-based financial transaction) when card 100 is swiped through a read-head housing of the magnetic stripe reader. During such a transaction, dynamic magnetic stripe communications device 102 may be activated in response to such a detection to provide one or more tracks of magnetic stripe data to the detected magnetic stripe reader.

Card 100 may be implemented using architecture 150, which may include one or more processors 154. One or more processors 154 may be configured to utilize external memory 152, internal memory of processor 154, or a combination of external memory 152 and internal memory for storing information, such as executable machine language, related dynamic machine data, non-time smearing gain algorithms and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included on architecture 150, that can communicate information with a chip reader (e.g., an EMV chip reader). Radio frequency identification (RFID) module 162 may be included within architecture 150 to enable the exchange of information with an RFID reader.

Other input and/or output devices 168 may be included on architecture 150, for example, to provide any number of input and/or output capabilities. For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a period of time (e.g., approximately 2-4 years). One or more batteries 158 may be included, for example, as rechargeable batteries.

Electromagnetic field generators 170-174 may be included on architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between the various I/O devices implemented on architecture 150 may be determined by processor 154. One or more proximity detectors 166 may be utilized, for example, to sense the proximity, mechanical distortion, or actual contact, of an external device, which in turn, may trigger the initiation of a communication sequence by processor 154. The sensed presence, mechanical distortion, or touch of the external device may be effective to, for example, determine the type of device or object detected.

For example, the detection may include the detection of, for example, a read-head housing of a magnetic stripe reader. The detection may include a detection of a read-head housing as it moves at a high rate of speed and/or a changing rate of speed in relation to a card (e.g., card 100 of FIG. 1). In response, processor 154 may activate one or more electromagnetic field generators 170-174 to initiate a communications sequence with, for example, one or more read-heads of the magnetic stripe reader.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Figure 2:
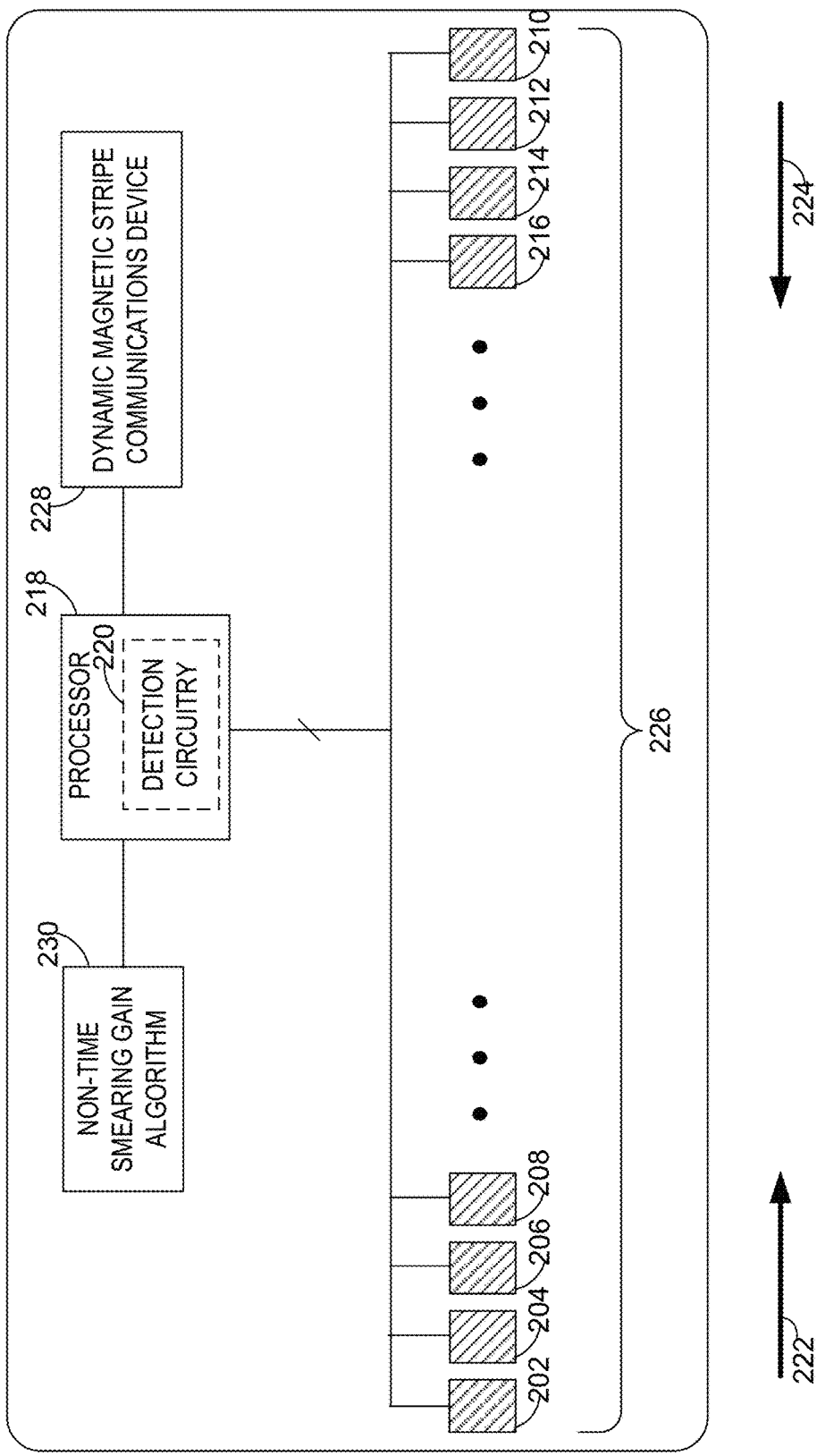
FIG. 2 is an illustration of a card constructed in accordance with the principles of the present invention.

Turning to FIG. 2, a card is shown having an orientation of detectors 226, whereby one or more detectors 202-216 may be, for example, arranged along a length of card 200. Detectors 202-216 may be provided, for example, as conductive pads using, for example, an additive technique, whereby patterns of a conductive element (e.g., copper) may be applied to a PCB substrate according to a patterning mask definition layer. Detectors 202-216 may be provided, for example, as conductive pads using, for example, a subtractive technique whereby patterns of a conductive element (e.g., copper) may be removed from a pre-plated PCB substrate according to an etching mask definition layer. Other non-PCB fabrication techniques may be used to implement conductive pads 202-216 as may be required by a particular application.

Detection circuitry 220 of processor 218, conductive pads 202-216, processor 218, and non-time smearing gain algorithm 230 may be combined to provide a detection system. Persons skilled in the art will appreciate that any number of conductive pads may be utilized by a processor as capacitive sensing pads. Particularly, a processor may include the functionality to control a detection system to determine when an object is in the proximity of one or more conductive pads via a capacitive sensing technique.

Figure 3:
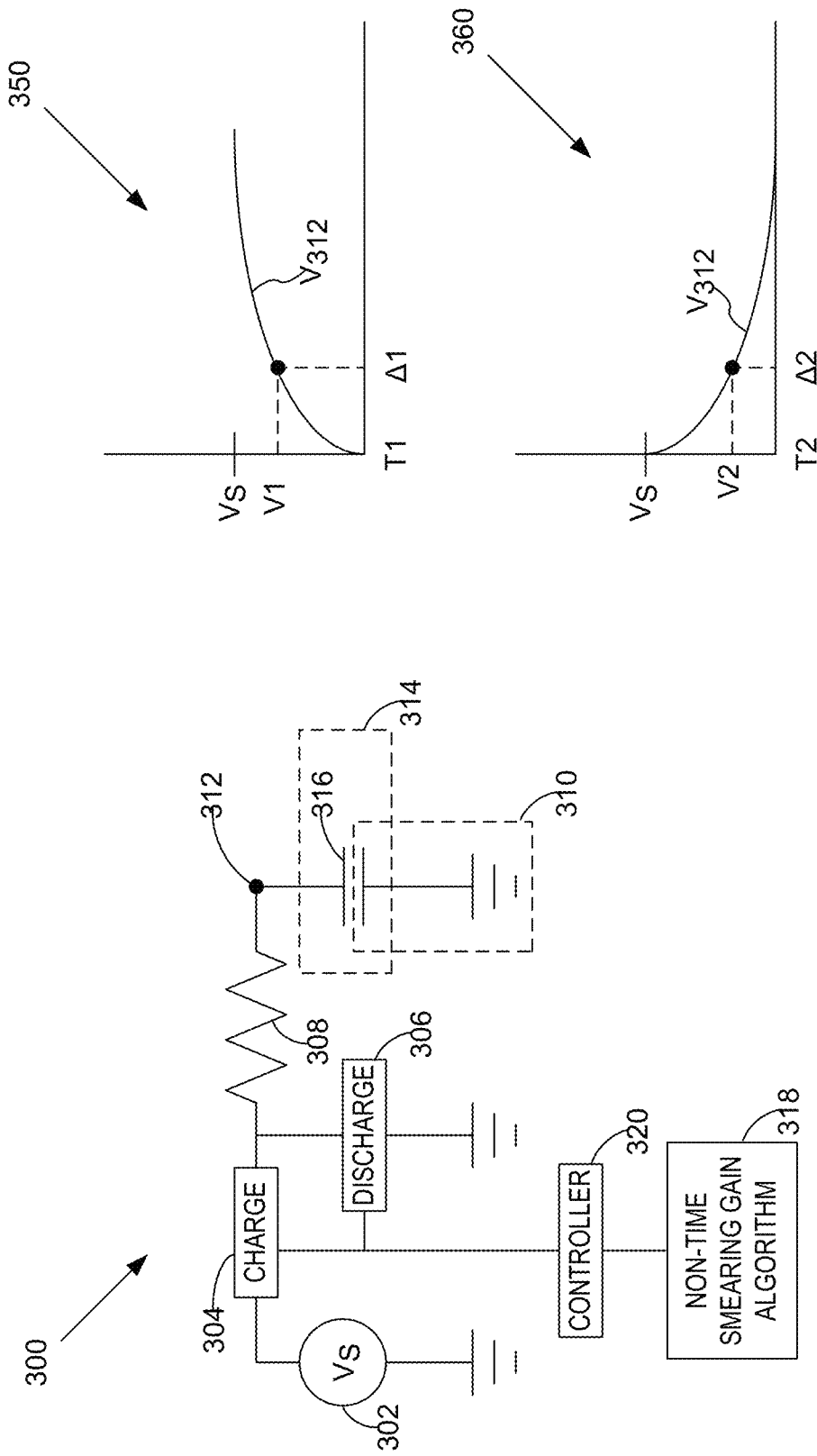
FIG. 3 is an illustration of circuitry, and associated waveforms, constructed in accordance with the principles of the present invention.

FIG. 3 shows detection circuitry 300. A conductive pad may be utilized, for example, as a conductor of a capacitive device within a resistor/capacitor (RC) circuit to determine the capacitance of a conductive pad and determine whether the capacitance is below, equal to, or above one or more predetermined thresholds.

A conductive pad may, for example, form a portion of a capacitive element, such that plate 316 of capacitive element 314 may be implemented by a conductive pad and the second plate of capacitive element 314 may be implemented by element 310. Element 310 may represent, for example, the device or object whose proximity or contact is sought to be detected.

The capacitance magnitude of capacitive element 314 may exhibit, for example, an inversely proportional relationship to the distance separation between plate 316 and device 310. For example, the capacitance magnitude of capacitive element 314 may be relatively low when the corresponding distance between plate 316 and device 310 may be relatively large. The capacitance magnitude of capacitive element 314 may be relatively large, for example, when the corresponding distance between plate 316 and device 310 is relatively small.

Detection may be accomplished, for example, via circuit 300 of FIG. 3. Through a sequence of charging and/or discharging events, a capacitance magnitude change for capacitive element 314 may be monitored over a given period of time. In so doing, for example, the spatial relationship (e.g., the separation distance) between plate 316 and device 310 may be approximated.

Charge sequence 350 may, for example, be optionally invoked, such that charge circuit 304 may be activated at time T1, while discharge circuit 306 may remain deactivated. Accordingly, for example, current may flow through resistive component 308. In doing so, for example, an electrostatic field may be generated that may be associated with capacitive component 314. During the charge sequence, for example, the voltage at node 312 may be monitored to determine the amount of time required (e.g., $T_{CHARGE}=\Delta 1-T1$) for the voltage at node 312, $V_{312}$, to obtain a magnitude that is substantially equal to, below, or above a first threshold voltage (e.g., equal to V1).

Discharge sequence 360 may, for example, be optionally invoked, such that discharge circuit 306 may be activated at time T2, while charge circuit 304 may remain deactivated. During the discharge sequence, for example, the electric field associated with capacitive element 314 may be allowed to discharge through resistive component 308 to a reference potential (e.g., ground potential). The voltage at node 312 may be monitored to determine the amount of time required (e.g., $T_{DISCHARGE}=\Delta 2-T2$) for the voltage at node 312, $V_{312}$, to obtain a magnitude that is substantially equal to, below, or above a second threshold voltage (e.g., equal to V2).

Once the charge time, $T_{CHARGE}$, and/or discharge time, $T_{DISCHARGE}$, are determined, the charge and/or discharge times may be utilized to calculate a capacitance magnitude that may be exhibited by capacitive element 314. For example, given that the magnitude of voltage, V1, may be equal to approximately 63% of the magnitude of voltage, $V_s$, then a first relationship may be defined by equation (1) as:

$$T_{CHARGE}=R_{308}*C1, \qquad (1)$$

where $R_{308}$ is the resistance magnitude of resistive element 308 and C1 is proportional to a capacitance magnitude of a capacitive element (e.g., capacitive element 314).

Similarly, for example, given that the magnitude of voltage, V2, is equal to approximately 37% of the magnitude of voltage, $V_s$, then a second relationship may be determined by equation (2) as:

$$T_{DISCHARGE}=R_{308}*C2, \qquad (2)$$

where C2 is proportional to a capacitance magnitude of capacitive element 314. The capacitance magnitudes, $C_1$ or $C_2$, may then be calculated from equations (1) or (2), respectively, and taken by themselves to determine a capacitance magnitude that may be exhibited by capacitive element 314. Alternatively, for example, capacitance magnitudes, $C_1$ and $C_2$, may be calculated from equations (1) and (2), respectively, and averaged to determine a capacitance magnitude that may be exhibited by capacitive element 314.

Persons skilled in the art will appreciate that circuits 304 and/or 306 may be activated and deactivated by controller 320. Accordingly, for example, controller 320 may control when the charge and/or discharge events occur. Persons skilled in the art will further appreciate that controller 320 may adjust a frequency at which circuits 304 and 306 may be activated and/or deactivated, thereby adjusting a sampling rate at which the capacitance magnitudes, $C_1$ and/or $C_2$, may be measured. Accordingly, for example, controller 320 may implement a detection algorithm (e.g., non-time smearing gain algorithm 318) to determine a position, velocity and/or an acceleration of an object based on the processing of relative capacitance magnitude variations of a series of pads over time in accordance with such an algorithm.

Turning back to FIG. 2, for example, a series of charge and/or discharge cycles for pads 202-216 may be executed by processor 218 to determine, for example, a relative capacitance magnitude that may be exhibited by each of pads 202-216. A series of charge and/or discharge cycles for each of pads 202-216 may be executed by processor 218, for example, in order to obtain a capacitance characteristic for each of pads 202-216 over time, thereby determining whether an object (e.g., a read-head housing of a magnetic stripe reader) is within a proximity to card 200, whether that object is moving with respect to card 200 and if so, what direction that object is moving and/or whether that object is accelerating with respect to card 200.

Processor 218 may, for example, measure the charge time (e.g., $T_{CHARGE}$ of equation (1)) and/or the discharge time (e.g., $T_{DISCHARGE}$ of equation (2)) by counting a number of periods of an oscillation signal (e.g., an oscillation signal generated within processor 218) that are required to achieve the respective voltage threshold values (e.g., V1 and/or V2 of FIG. 3) for each of pads 202-216 over a period of time. Processor 218 may, for example, implement a filtering/averaging algorithm in accordance with equation (3) to compute a number of periods, Count[n], of an oscillation signal that are required to achieve the respective voltage threshold value for the $n^{th}$ pad of an array of N pads over a period of time.

$$\text{Count}[n(t)]=\text{Count}[n(t-1)]+\text{New Count}-(\text{Count}[n(t-1)]+1)/2 \qquad (3)$$

where Count[n(t-1)] is the number of periods of an oscillation signal that were required for the $n^{th}$ pad of a pad array having N pads to achieve its respective voltage threshold level during the previous charge and/or discharge cycle and where New Count is the number of periods of an oscillation signal that were required for the $n^{th}$ pad of a pad array having N pads to achieve its respective voltage threshold level during a subsequent charge and/or discharge cycle.

The algorithm of equation (3) may, for example, filter out capacitance detection variations for the $n^{th}$ pad of an N pad array due to noise (e.g., detection sensitivity variation, quantization noise and power supply noise). However, the algorithm of equation (3) may also tend to smear detection results across adjacent time periods by using the previous detection results in a calculation of the current detection results, thereby providing an artificial "lengthening" of each detection pad.

Accordingly, for example, as swipe speeds increase, an alternate algorithm (e.g., non-time smearing algorithm 230) may be implemented to eliminate the time-smearing effects that may prohibit an accurate detection of the position, velocity and/or acceleration of an object (e.g., a read-head housing of a magnetic stripe reader) that may be in proximity to card 200. For example, a non-time smearing algorithm in accordance with equation (4) may be used to obtain a more accurate count for specific pads of interest in real time.

$$\text{Count}[n(t)]=\text{New Count}*\text{Gain Value}, \qquad (4)$$

where New Count is the number of periods of an oscillation signal that were required for the $n^{th}$ pad of a pad array having N pads to achieve its respective voltage threshold level during the current charge and/or discharge cycle and Gain Value is an integer multiplier (e.g., 2, 4, 8 or 16).

By comparing the time-based capacitance characteristic of each pad 202-216, as may be approximated by equations (3) or (4), to a threshold capacitance value, a determination may be made, for example, as to when pads 202-216 are in a proximity, or touch, relationship with a device whose presence is to be detected. For example, a sequential change (e.g., increase) in the relative capacitance magnitudes of pads 202-208, respectively, and/or pads 216-210, respectively, may be detected and a determination may be made that a device is moving substantially in direction 222 relative to card 200. A sequential change (e.g., increase) in the relative capacitance magnitudes of detectors 210-216, respectively, and/or 208-202, respectively, may be detected, for example, and a determination may be made that a device is moving substantially in direction 224 relative to card 200.

Persons skilled in the art will appreciate that by electrically shorting pairs of detectors together (e.g., pair 202/210, pair 204/212, pair 206/214, etc.) directional vectors 222 and 224 become insubstantial. For example, regardless of whether a device is moving substantially in direction 222 or substantially in direction 224 relative to card 200, a determination may nevertheless be made that a device is close to, or touching, card 200.

Detection circuitry 220 of processor 218 may be used in conjunction with, for example, one or more pads 202-216 to determine that a device (e.g., a read-head housing of a magnetic stripe reader) is in close proximity, or touching, one or more of pads 202-216. Processor 218 may, for example, utilize non-time smearing gain algorithm 230 to detect a device when that device is moving at a relatively high rate of speed with respect to card 200. For example, non-time smearing gain algorithm 230 may detect a capacitance change in a conductive pad during a time period, without consideration of a capacitance change in that conductive pad during previous time periods, to determine that a device is moving in relation to pads 202-216. Once a device is detected, processor 218 may, for example, communicate with the detected device via dynamic magnetic stripe communications device 228.

Figure 4:
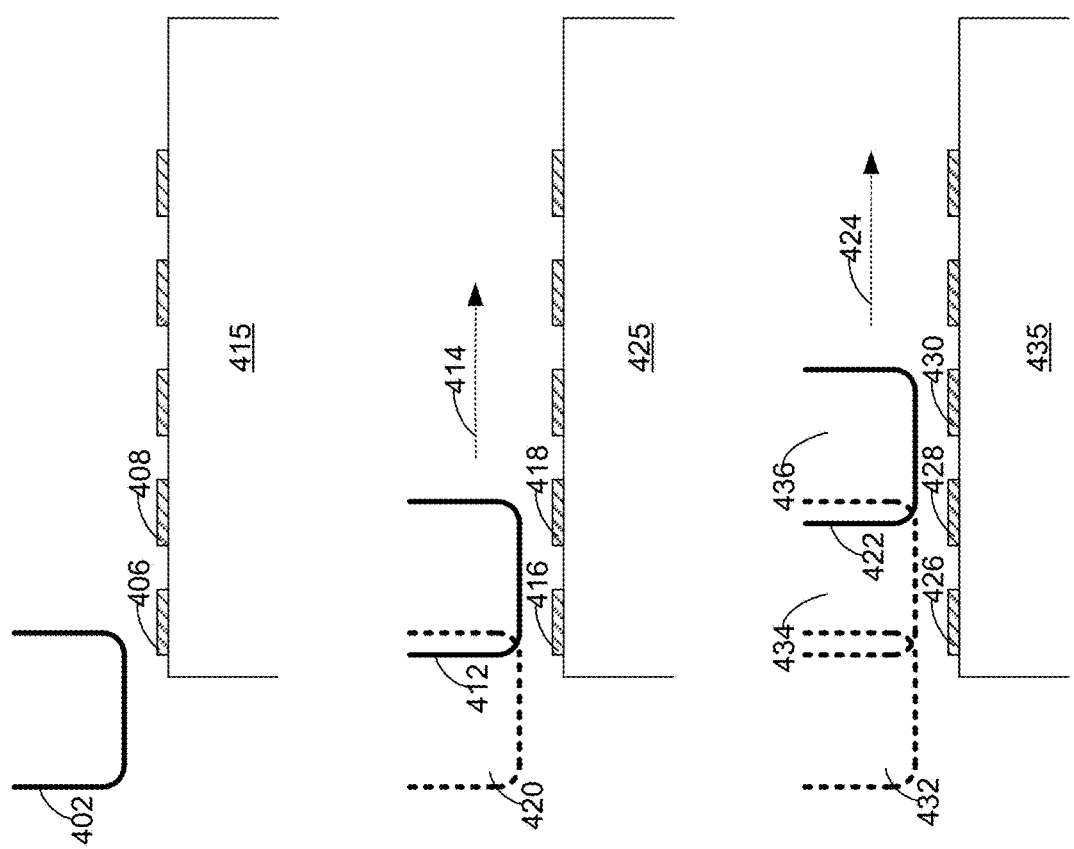
FIG. 4 is an illustration of a card constructed in accordance with the principles of the present invention.

FIG. 4 shows a card that is in proximity to a device (e.g., a read-head of a magnetic stripe reader). Card 415 may be in proximity to a device such that a distance between conductive pad 406 and read-head 402 is less than a distance between conductive pad 408 and read-head 402. Accordingly, for example, a relative capacitance magnitude that may be associated with conductive pad 406 may be, for example, greater than a relative capacitance magnitude that may be associated with conductive pad 408. In so doing, for example, a processor that may be monitoring the relative capacitance magnitudes of conductive pads 406 and 408 may determine that a device is closer to conductive pad 406 than to conductive pad 408 by applying a non-time smearing gain algorithm to more accurately detect a capacitance change in pads 406 and 408 without applying any capacitance change results that may have been detected for pads 406 and 408 in previous time periods.

Card 425 may be in proximity to a device (e.g., read-head 412) that may have been moved from position 420 such that a distance between conductive pad 418 and device 412 may be slightly greater than a distance between conductive pad 416 and device 412. Accordingly, for example, a capacitance magnitude that may be associated with conductive pad 416 may be, for example, slightly greater than a capacitance magnitude that may be associated with conductive pad 418. In so doing, for example, a processor that may be monitoring the capacitance magnitudes of conductive pads 416 and 418 may determine that a device may be travelling in direction 414. Further, a processor may determine that a device is slightly closer to conductive pad 416 than to conductive pad 418 by applying a non-time smearing gain algorithm to more accurately detect a capacitance change in pads 416 and 418 without applying any capacitance change results that may have been detected for pads 416 and 418 in previous time periods.

Card 435 may be in proximity to a device (e.g., read-head 422) that may have moved from position 432 to 434. Accordingly, for example, a capacitance magnitude that may be associated with conductive pad 428 may be slightly greater than a capacitance magnitude that may be associated with conductive pad 426. In so doing, for example, a processor that may be monitoring the capacitance magnitudes of conductive pads 426 and 428 may determine that a device may be travelling in direction 424. Further, a processor may determine that a device is slightly closer to conductive pad 428 than to conductive pad 426 by applying a non-time smearing gain algorithm to more accurately detect a capacitance change in pads 426 and 428 without applying any capacitance change results that may have been detected for pads 426 and 428 in previous time periods.

Device 422 may move from position 434 to position 436. Accordingly, for example, a capacitance magnitude that may be associated with conductive pad 430, for example, may be slightly greater than a capacitance magnitude that may be associated with conductive pad 428. In so doing, for example, a processor that may be monitoring the capacitance magnitudes of conductive pads 430 and 428 may determine that a device may be travelling in direction 424.

Further, a processor may determine, for example, that a device is first located closest to conductive pad 426, the device is then located closest to conductive pad 428, and the device is then located closest to conductive pad 430 in succession by detecting, for example, that a capacitance magnitude of conductive pad 426 changes (e.g., increases), followed by a capacitance change (e.g., increase) of conductive pad 428 by applying a non-time smearing gain algorithm to more accurately detect a capacitance change in pads 426 and 428 without applying any capacitance change results that may have been detected for pads 426 and 428 in previous time periods, and then followed by a capacitance change (e.g., increase) of conductive pad 430 by applying a non-time smearing gain algorithm to more accurately detect a capacitance change in pads 428 and 430 without applying any capacitance change results that may have been detected for pads 428 and 430 in previous time periods. In response to a sequential capacitance change in pads 426, 428, and 430, respectively, a processor may activate one or more electromagnetic field generators to initiate a communications sequence with, for example, read-head 422.

Figure 5:
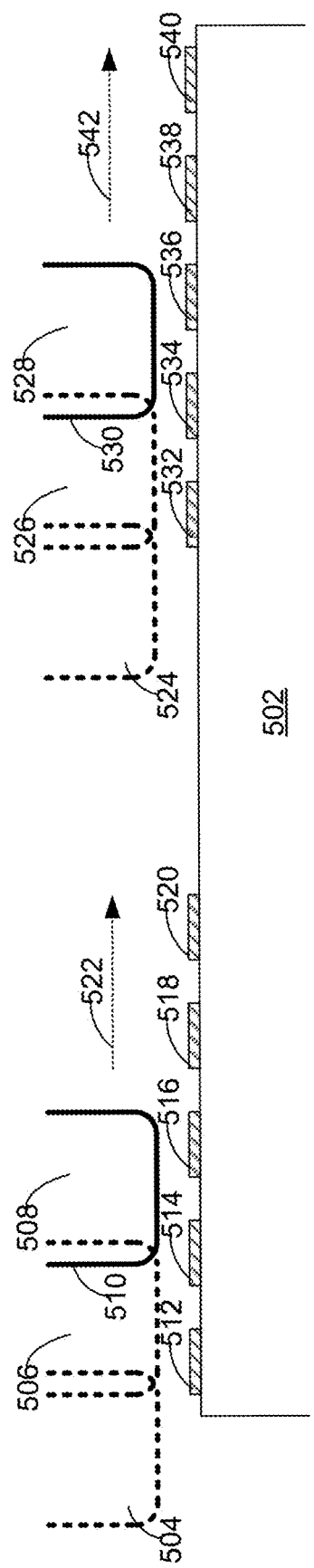
FIG. 5 is an illustration of a card constructed in accordance with the principles of the present invention.

FIG. 5 shows a card that is in proximity to a device (e.g., read-head 510 of a magnetic stripe reader). Card 502 may provide a first set of conductive pads (e.g., pads 512-520) that may be used by a processor of card 502, for example, to initially detect a device (e.g., read-head 510) that may be in proximity to card 502 or that may be touching card 502. Further, a processor of card 502 may detect movement of read-head 510 in direction 522 at locations 504, 506, and 508 by applying a non-time smearing gain algorithm to more accurately detect a capacitance change in pads 514 and 516, for example, without applying any capacitance change results that may have been detected in previous time periods for pads 512 and 514, respectively. In response, a processor of card 502 may be placed on standby and thereby readied to activate one or more electromagnetic field generators to initiate a communications sequence with, for example, read-head 510.

Card 502 may provide a second set of conductive pads (e.g., pads 532-540) that may be used, for example, to provide detection verification of a device (e.g., read-head 530). Accordingly, for example, a presence of a device may be twice detected, for example, so as to confirm that a device was accurately detected and a processor of card 502 may then commence communications with that device.

Post-detection verification may be useful, for example, to reduce false alarm detections of a device. For example, a processor of card 502 may verify through post-detection verification that a presence of a device (e.g., a read head of a magnetic stripe reader as opposed to any other type of device) was reliably detected and that a communication sequence with the device may then commence. In so doing, for example, a processor of card 502 may reduce power consumption by requiring a second detection in succession to a first detection before establishing communications with the device.

Figure 6:
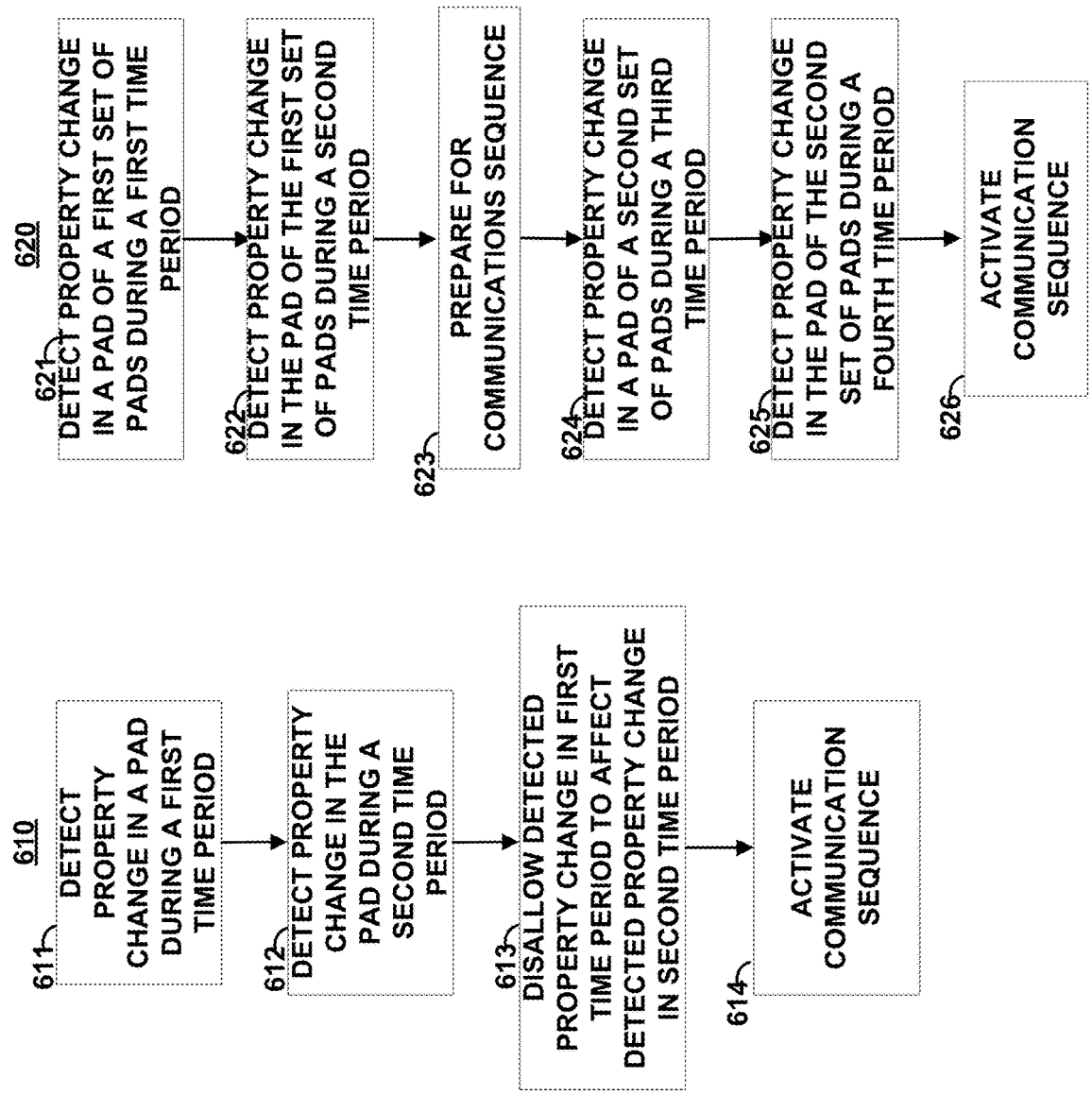
FIG. 6 is an illustration of process flow charts constructed in accordance with the principles of the present invention.

A flow diagram of a detection activity is shown in FIG. 6. Step 611 of sequence 610 may initiate a detection operation, for example, where a property change (e.g., an increased capacitance) associated with a conductive pad is detected during a first time period. A property change (e.g., a capacitance increase) may then be detected in the conductive pad during a second time period (e.g., as in step 612). A relative property change detected in the first time period is not allowed to affect a relative property change detected in the second time period (e.g. as in step 613) by applying a non-time smearing gain algorithm. In so doing, a detection activity may be sensitive to property changes detected in a conductive pad during a time period that is independent of property changes detected in the conductive pad during one or more previous time periods.

In step 621 of sequence 620, a property change (e.g., an increased capacitance) associated with a pad of a first set of pads may be detected during a first time period. A property change (e.g., a capacitance increase) may then be detected in the pad of the first set of pads during a second time period (e.g., as in step 622), where a relative capacitance change detected in the first time period is not allowed to affect a relative capacitance change detected in the second time period by applying a non-time smearing gain algorithm. In step 623, a processor may prepare a dynamic magnetic stripe communications device for communication, but may refrain from activating the dynamic magnetic stripe communications device until a verification detection occurs.

In step 624, a property change (e.g., an increased capacitance) associated with a pad of a second set of pads may be detected during a third time period. A property change (e.g., a capacitance increase) may then be detected in the pad of the second set of pads during a fourth time period (e.g., as in step 625), where a relative capacitance change detected in the third time period is not allowed to affect a relative capacitance change detected in the fourth time period by applying a non-time smearing gain algorithm. In step 626, after two detections in succession, a processor may activate a communication sequence (e.g., a dynamic magnetic stripe communications device may communicate a first, a second and/or a third track of magnetic stripe information to a detected read head of a magnetic stripe reader).

Motorized Readers.

The present invention improves powered cards and/or other payment device type function such that it may perform properly in most of the ATMs nationwide. The behavior of motorized readers was studied based on a motorized reader of the leading supplier of ATMs to banks.

Figure 7:
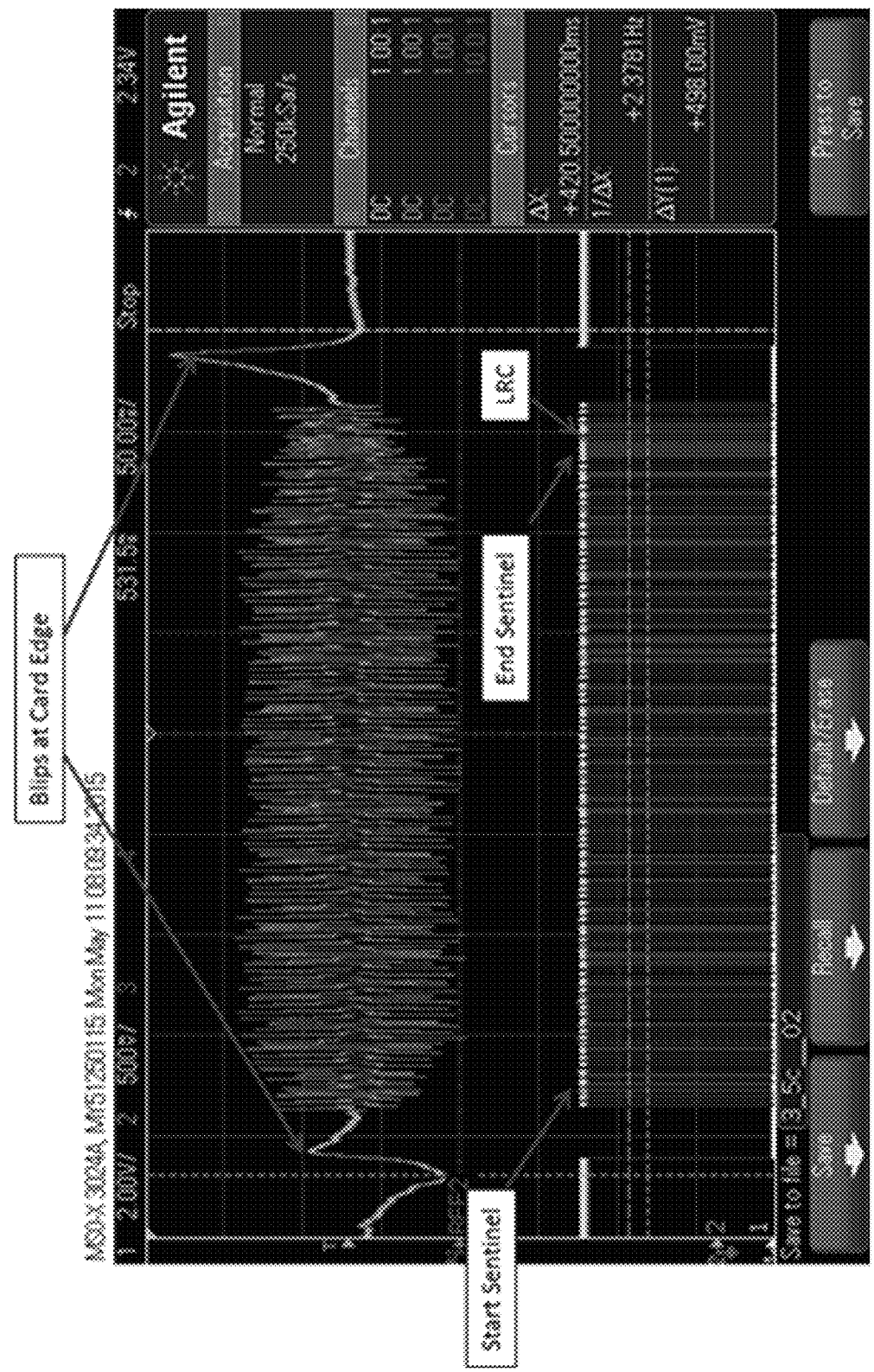
FIG. 7 is an oscilloscope screenshot of raw analog data of an exemplary embodiment in accordance with the principles of the present invention.

A successful read on an ATM may occur when all 40 bytes of information data of Track 2 on the card are sent to the reader within the two blips with data transmission speed matching that of the reader rolling speed. FIG. 7 is oscilloscope screenshot of raw analog data (green) the motorized reader received and corresponding digital data (yellow) that the motorized reader parsed from the analog data during a successful read with info data: ";2012080601100200=00020120730001015001?". As shown in FIG. 7, all the information data including the start sentinel, the end sentinel and LRC may be interpreted from the raw analog signal by the reader. The reader may fail to read out information data if some part of the analog data is not received within the two blips, or the signal transmission speed of the card does not match the reader's rolling speed.

According to some example embodiments, multiple issues may cause some of our cards/devices to fail to perform transactions at an ATM. According to other example embodiments a transaction may not fail.

According to some example embodiments, the data transmission speed may be set to be constant (i.e. BITRATE 8), which may be equivalent to 1400 mm/s in rolling speed. This speed may be 3 to 6 times faster than that of motorized readers in the field. Table 1 shows the effect of Leading 0 and data transmission speed to the successful read on the motorized reader. Its rolling speed may be 190 mm/s with minimum 1 byte of leading 0 required. A representative powered card was read 5 times on each setup. As shown in the table, no successful read was made at all by the reader when the data transmission speed reached 1.5 times that of the reader rolling speed.

According to some other example embodiments, the rolling speed of the reader may be calculated with acceptable accuracy and the data transmission speed may be assigned to a value matched to the calculated rolling speed with 25% of tolerance to perform a successful read.

Table 1 Successful Read on motorized reader with Different Leading 0 and Data Transmission Speed Setup.

| | | Data Transmission Speed | | | | | |
|---|---|---|---|---|---|---|---|
| | | (Row 1: Bitrate, Row 2: Rolling Speed (mm/s), Row 3: Ratio of Data Transmission Speed to Reader Rolling Speed) | | | | | |
| LeadOS | 92 | 90 | 88 | 86 | 84 | 82 | 80 |
| | 190 | 194.2222 | 198.64 | 203.2558 | 208.0952 | 213.1707 | 218.5 |
| | 1 | 1.022222 | .045545 | 1.069767 | 1.095238 | 1.121951 | 1.15 |
| 1 | 5 | 5 | 5 | 5 | 5 | 5 | 5 |
| 2 | 5 | 5 | 5 | 5 | 5 | 5 | 5 |
| 3 | 4 | 4 | 5 | 5 | 5 | 5 | 5 |
| 4 | 0 | 0 | 5 | 4 | 5 | 5 | 5 |
| 5 | 0 | 0 | 0 | 3 | 5 | 5 | 5 |
| 6 | 0 | 0 | 0 | 0 | 3 | 3 | 5 |
| 7 | 0 | 0 | 0 | 0 | 0 | 0 | 4 |
| 8 | 0 | 0 | 0 | 0 | 0 | 0 | 2 |
| 9 | 0 | 0 | 0 | 0 | 0 | 0 | 0 |

| | Data Transmission Speed | | | | | | | |
|---|---|---|---|---|---|---|---|---|
| | (Row 1: Bitrate, Row 2: Rolling Speed (mm/s), Row 3: Ratio of Data Transmission Speed to Reader Rolling Speed) | | | | | | | |
| Lead0S | 78 | 76 | 74 | 72 | 70 | 68 | 66 | 64 |
| | 224.1026 | 230 | 236.2162 | 242.7778 | 249.7143 | 257.0588 | 264.8485 | 273.125 |
| | 1.179487 | 1.210526 | 1.243243 | 1.277778 | 1.314286 | 1.352941 | 1.393939 | 1.4375 |
| 1 | 5 | 5 | 5 | 0 | 0 | 0 | 0 | 0 |
| 2 | 5 | 5 | 5 | 0 | 0 | 0 | 0 | 0 |
| 3 | 5 | 5 | 5 | 5 | 5 | 5 | 5 | 0 |
| 4 | 5 | 5 | 5 | 5 | 5 | 5 | 5 | 0 |
| 5 | 5 | 5 | 5 | 5 | 5 | 5 | 5 | 0 |
| 6 | 5 | 5 | 5 | 5 | 5 | 5 | 5 | 0 |
| 7 | 5 | 5 | 5 | 5 | 5 | 5 | 5 | 0 |
| 8 | 4 | 5 | 5 | 5 | 5 | 5 | 5 | 0 |
| 9 | 0 | 4 | 4 | 5 | 5 | 5 | 5 | 0 |

According to some example embodiments, track 1 and track 2 data may always be sent out with the same length. Given track 2 is shorter than track 1, a great number of lead or trail 0s may be filled to track 2 to match the track 1 data length. More lead 0s may require faster data transmission speed so that all info data may be sent out before the reader head slides out of the card/device. As shown in FIG. 7, with lead 0 increases, the minimum data transmission speed for successful read also increases.

According to some other example embodiments, only a track 2 signal may be communicated when the card/device is read by the motorized reader with, for example, 5 bytes of lead and trail 0s.

Figure 8:
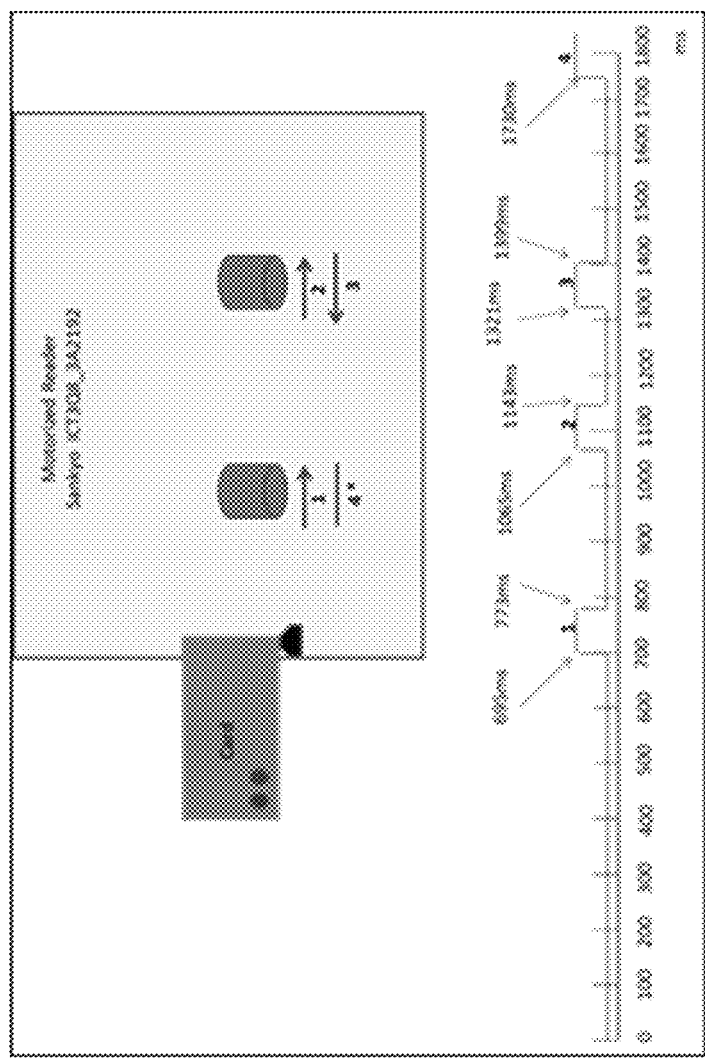
FIG. 8 is a graph of a button press for an exemplary embodiment in accordance with the principles of the present invention.

The button of the powered card or device may be pressed by the roller inside of the reader, which may leave a strong probability that the card/device will go to sleep and fail the transaction. FIG. 8 is a graph of a button press causing sleep state when a powered card is being read by a motorized reader Specifically, as shown in FIG. 8, for the motorized reader, card button was pressed four times during the transaction.

According to some other example embodiments, the button presses when the card is in the motorized reader may be blocked and unblocked when the card is out of the reader. For example, signals from the button may be disregarded by the card/device while inside the motorized reader. As another example, the button may be physically locked.

According to some example embodiments, no reader type detection function may be used. The card/device may always behave as if it is being used in a manual swipe reader. As noted above, there are differences (e.g., major differences) between a motorized reader and a manual swipe reader.

According to some other example embodiments, the card/device may recognize the reader type and behave accordingly depending on the reader type it recognized. The card/device may be able to detect the reader type and assign parameters to the card accordingly.

According to some example embodiments, inductive sensing may be used for reader type recognition and reader rolling speed calculation for use by the card/device in a motorized reader. A triggering algorithm and a corresponding tuning algorithm may be included.

Triggering Algorithm.

Figure 9:
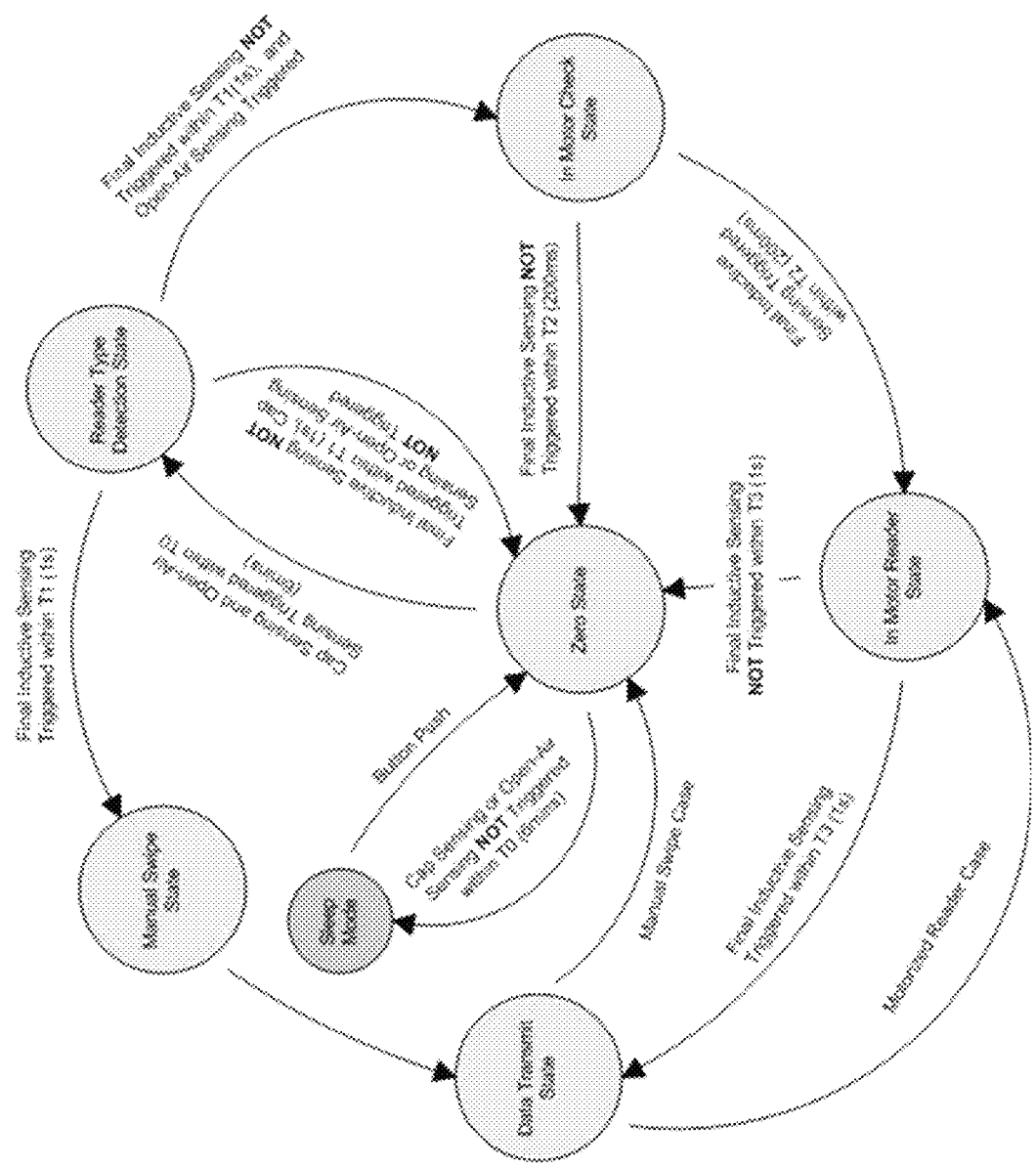
FIG. 9 is a decision flowchart in accordance with the principles of the present invention.

FIG. 9 is a decision flowchart for new triggering algorithm. As shown in FIG. 9, six states may be used in a triggering algorithm. Table 2 lists the timing variables used.

The card/device may be in Zero State when waking up from sleep mode. In Zero State, the card/device may keep performing capacitive sensing and open-Air inductive sensing before timeout (i.e. T0). As shown in FIG. 9, the card/device may go to Reader Type Detection State if both the cap and open-air inductive sensing are triggered.

In the Reader Type Detection State, the card/device may rely on the gate sensing function to tell the reader type. If the final inductive sensing is not triggered within T1, the card/device may treat the reader as a motorized reader, otherwise it may be treated as manual swipe reader. A feature (e.g., test feature and/or production feature) may be included into the function so that a BLUE LED may light up when the reader type is recognized as a motorized reader. Each test device was inserted into different types of readers for 10 times, respectively. Table 3 shows the result for the reader type detection function. The test results show 0% false rate for a motorized reader, 12.5% false rate for a USB reader, and 22.5% false rate for a leading swipe reader. For Table 3, the value on the left of the colon refers to the total number of motorized reader swipes that the device interpreted to be in the test, while the value on the right of the colon indicates the number of the manual swipe reader swipes that the device interpreted to be in the test.

In the case of a manual swipe reader, the device may go to Manual Swipe State, may setup data transmission parameters for manual swipe, and may go to Data Transmit State to send out data.

In the case of motorized reader, the card may go to In Motor Check State.

Table 2 Timing Variables for Example Triggering Algorithm.

| Variable | Example Values | Description |
|---|---|---|
| T0 | 6 mins | Timeout for Zero State |
| T1 | 1 sec | Timeout for In Reader Type Detection State |
| T2 | 200 ms | Timeout for In Motor Check State |
| T3 | 1 sec | Timeout for In Motor Reader State |

In Motor Check State, the device may send a signal out to open a gate and may check if the final inductive sensing is triggered before timeout (i.e. T2). If it's triggered, the device may be confirmed to be inside of the reader. It may go to In Motor Reader State; otherwise the device may go back to Zero State to start over again.

In Motor Reader State, the device may have to wait for the Open-Air sensing to stop triggering in order to make sure the device is off the gate head. After that, it may wait for Open-Air to be triggered again, and may check direction, may assign Start-Timing tune and final inductive tune value for rolling speed calculation sequentially, and may assign the calculated rolling speed to data transmission function before the card/device sends out data. If the final inductive trigger does not occur within T3, the device may return to Zero State to start over.

Table 3 Result for Reader Type Detection Function.

| | Reader Type (Motorized Reader: Manual Swipe Reader) | | |
|---|---|---|---|
| Card No. | Motorized Reader | USB Manual Reader | P.O.S Manual Reader |
| 10 | 10:0 | 2:8 | 2:8 |
| 22 | 10:0 | 1:9 | 3:7 |
| 4 | 10:0 | 2:8 | 2:8 |
| 17 | 10:0 | 0:10 | 2:8 |

Figure 10:
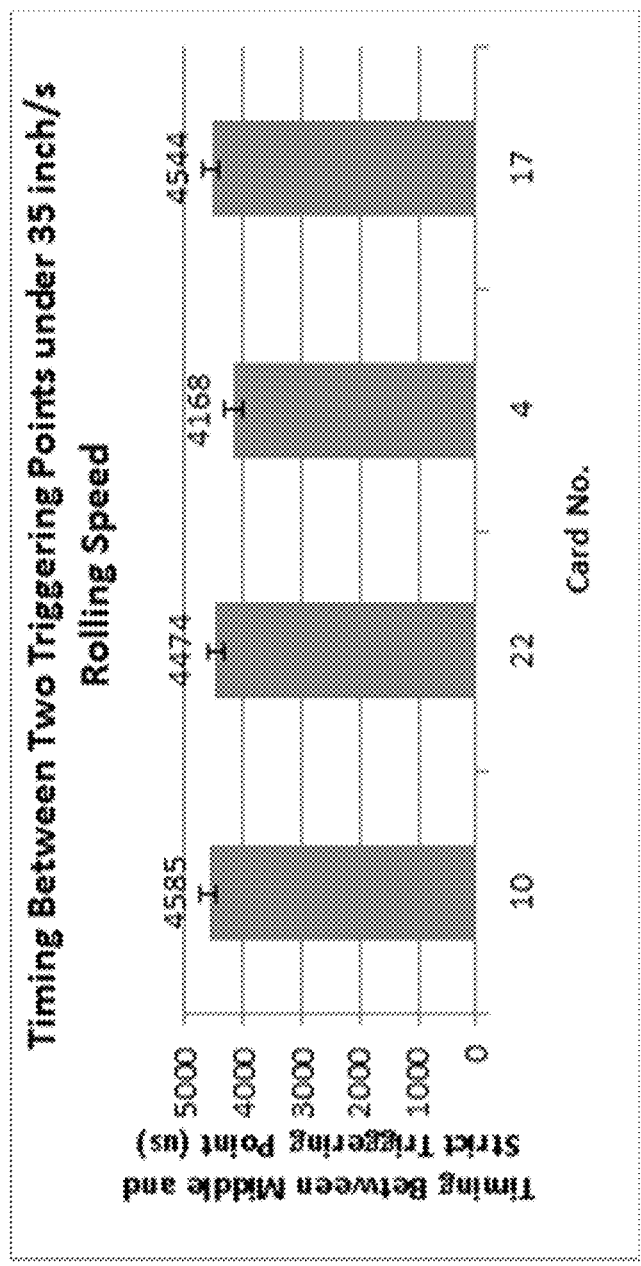
FIG. 10 is a graph of the timing recorded for some exemplary embodiments in accordance with the principles of the present invention.

The rolling speed may be calculated in In Motor Reader State; specifically, card may start timing once the Start-Timing inductive sensing is triggered, and may stop timing when the final inductive sensing is triggered. Three groups may be predefined in the speed calculation function; e.g., rolling speed<=10 inch/s being Group 1, rolling speed>10 inch/s and <=14 inch/s being Group 2, and rolling speed>14 inch/s being Group 3. Data transmission speed may be set to 8 inch/s, 12 inch/s, and 16 inch/s for now, when the reader's rolling speed dropped to Group 1, 2 and 3 respectively. Test was conducted on auto swipe with 35 inch/s rolling speed to verify the performance of the speed calculation function. FIG. 10 is a graph of the timing recorded by cards 10, 22, 4, and 17 under 35 inch/s rolling speed. The distance between middle trigger point and strict trigger point of the four test cards are 4.3 mm, 4.2 mm, 3.8 mm, and 4.3 mm, for Card 10, 22, 4, and 17 respectively. For 35 inch/s rolling speed, the expected timing counts are 4914, 4802, 4362, and 4902 for Card 10, 22, 4, 17 respectively. The corresponding timing counts recorded by the cards are 4585, 4474, 4168, and 4544 for Card 10, 22, 4, and 17 respectively as shown in FIG. 10, which may show 95% accuracy for speed calculation function.

In Data Transmit State, card may send out data with proper setup, such as track 2 out only if it's operated on a motorized reader. After data transmission is completed, if the transition is triggered by a motorized reader, card may go to In Motor Reader State to wait for next strict trigger; if it's triggered by a manual swipe reader, the card may go to zero state.

Tuning Algorithm.

Figure 11:
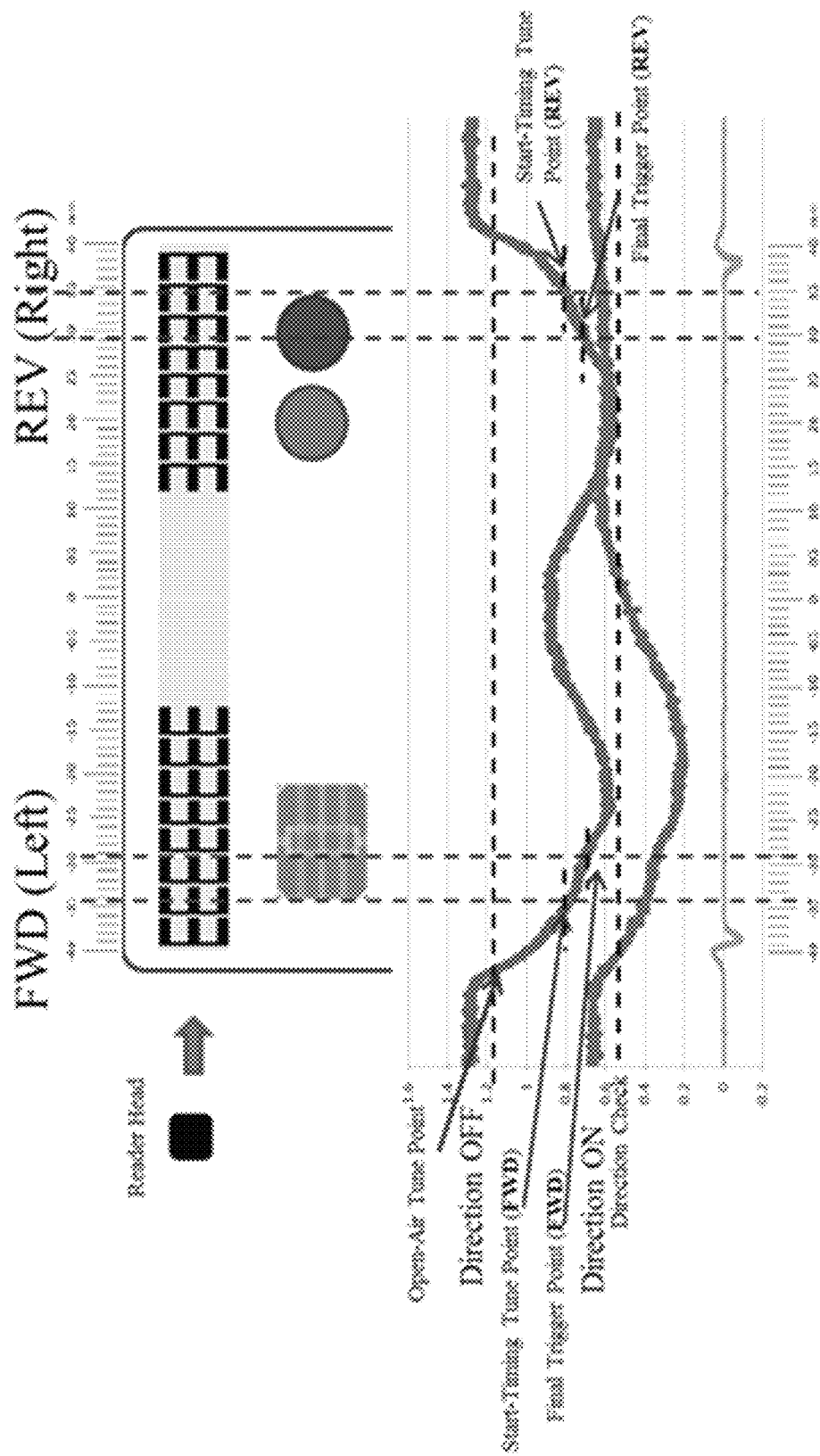
FIG. 11 is a graph of the inductive sensing outputs vs. head location for some exemplary embodiments in accordance with the principles of the present invention.

FIG. 11 is a graph of the inductive sensing outputs vs. head location. FIG. 11 illustrates the output curve of inductive sensing circuit when the mag head swipes cross the mag stripe as well as the trigger points that the card may need to be tuned. We may tune the Open-Air tune point, FWD and REV Start-Timing tune point, and FWD and REV final trigger tune point. The Open-Air tune point may be used together with the capacitive sensing to detect if the reader head is at the card edge. If the Open-Air tune point is triggered, direction check may be performed to sense the direction and assign the Start-Timing and final trigger tune point according to the direction sensed by the card. The middle trigger and strict trigger points may be utilized to calculate the rolling speed if the card is operated against a motorized reader with Start-Timing tune point being the point to start the timing and final trigger point being the point to stop the timing. The card/device may configure the data transmission function based on the reader type and send out data to the reader once the mag head reaches the final trigger point.

A first card/device architecture specific tuning jig may be applied to tune the trigger points according to example embodiments. With the first card/device specific tuning jig, the final trigger point may be pushed further in to make sure the card will not be triggered when it's blocked by the motorized reader gate. As shown in Table 4, for all the 4 test cards, the tuning values at gate are all larger than the second card/device specific tuned values, but all less than the first card/device specific-tuned values, which indicate only by using tuning point from first card/device specific jig, the card may not be triggered when it hits the gate. Even though the first card/device specific tuning point is further into the card, it should still pass the P.O.S. reader test since such tuning standard has been used for all the first card/device architecture units.

According to example embodiments, reader type detection function and rolling speed sensing function of the trigger algorithm performed well against the tests that had been conducted so far. More tests with different test parameter may be conducted to further verify the performance of the algorithm according to example embodiments.

Table 4 Tuning Value of a Representative Card at Motorized Reader Gate, Second Card/Device Architecture Final Trigger Tune Point, and Second Card/Device Architecture Final Trigger Tune Point.

| | Tuning Values | | |
|---|---|---|---|
| Card No. | Representative Powered Card at Gate | First Type of Powered Card Architecture | Second Type of Powered Card Architecture |
| 10 | 0x0E | 0x0C | 0x11 |
| 22 | 0x0F | 0x0B | 0x12 |
| 4 | 0x0B | 0x0A | 0x0E |
| 17 | 0x11 | 0x0D | 0x14 |

According to some example embodiments, a device may include longer stripe with more room for data transmission.

According to some example embodiments, a device may include a stripe with more turns for inductive sense improvement.

Persons skilled in the art will also appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A system comprising:
a device including
a capacitance detector including a first pad, the capacitance detector operable to detect capacitance associated with the first pad, an inductance detector including an inductor, the inductance detector operable to detect inductance of the inductor, and
a circuit operable to calculate a data transmission speed based, at least in part, on a first capacitance detected by the capacitance detector in a first period of time, a first inductance detected by the inductance detector in the first period of time and a second inductance detected by the inductance detector in a second period of time.

2. The system of claim 1, wherein the circuit is operable to calculate a motorized reader transmission speed upon the first capacitance indicating a presence of a read-head housing of a magnetic stripe reader, the first inductance indicating the presence of the read-head housing of the magnetic stripe reader, and the second inductance indicating a presence of a motorized reader gate.

3. The system of claim 2, wherein the device is operable to communicate to the magnetic stripe reader a first number of bits including track 1 data and a second number of bits including track 2 data, the first number of bits being equal to the second number of bits.

4. The system of claim 2, wherein the device is operable to communicate to the magnetic stripe reader a first number of bits including track 1 data and a second number of bits including track 2 data, the wherein the track 1 data is preceded by a number of leading bits and the track 2 data is preceded by more leading bits and the track 2 is preceded by more leading bits than the number of leading bits that precede track 1 data.

5. The system of claim 2, wherein the device is operable to communicate to the magnetic stripe reader a first number of bits including track 1 data and a second number of bits including track 2 data, the first number of bits being equal to the second number of bits, the track 1 data being preceded by a number of leading bits, and the track 2 data is preceded by more leading bits than the number of leading bits that precede track 1 data.

6. The system of claim 2, wherein the device is operable to communicate to the magnetic stripe reader a first number of bits including track 1 data and a second number of bits including track 2 data, the first number of bits being the same as the second number of bits, wherein the track 1 data includes a number of leading bits and trailing bits, and the track 2 data includes a greater number of leading bits and trailing bits than the number of leading and trailing bits of track 1 data.

7. The system of claim 2, wherein the device is operable to communicate to the magnetic stripe reader track 2 data and a total of 5 bytes of leading and trailing bits.

8. The system of claim 2, wherein the device is operable to communicate to the magnetic stripe reader only track 2 data and a total of 5 bytes of leading and trailing bits.

9. The system of claim 1, wherein the circuit is operable to calculate a manual swipe reader transmission speed upon the first capacitance indicating a presence of a read-head housing of a magnetic stripe reader, the first inductance indicating the presence of the read-head housing of the magnetic stripe reader, and the second inductance failing to indicate a presence of a motorized reader gate.

10. The system of claim 1, wherein the inductance detector is operable to detect the first inductance using open-air sensing.

11. The system of claim 1, wherein the inductance detector is operable to detect the first inductance using open-air sensing, and the device is operable to initiate sensing of a gate upon detection of both the first capacitance and the first inductance.

12. The system of claim 1, wherein the device includes a component operable to communicate a gate open signal.

13. The system of claim 1, wherein the device is operable to calculate a rolling speed.

14. The system of claim 1, wherein the device is operable to calculate a rolling speed based on, at least in part, a second capacitance detected by the capacitance detector.

15. The system of claim 1, wherein the device is operable to calculate a rolling speed based on, at least in part, a second capacitance detected by the capacitance detector, and assign the data transmission speed, the data transmission speed matched to the calculated rolling speed.

16. The system of claim 1, wherein the device is operable to calculate a rolling speed based on, at least in part, a second capacitance detected by the capacitance detector, and assign the data transmission speed, the data transmission speed within 25% of tolerance of a data transmission speed matched to the calculated rolling speed.

* * * * *